Patented Jan. 29, 1935

1,989,626

UNITED STATES PATENT OFFICE 1,989,626

PRODUCTION OF IMPROVED NATURAL WAXES

Wilhelm Pungs, Cologne, and Michael Jahrstorfer, Mannheim, Germany, assignors to I. G. Farbenindustrie Aktiengesellschaft, Frankfort-on-the-Main, Germany No Drawing. Application July 5, 1932, Serial No. 620,972. In Germany July 13, 1931

7 Claims. (Cl. 87—19)

The present invention relates to the production of improved natural waxes.

We have found that the properties of natural waxes of ester structure, such as carnauba wax, candelilla wax, beeswax, shellac wax, Montan wax and like waxes, are considerably improved by reacting the liquefied natural waxes with hydrogen in the presence of the known hydrogenation catalysts, such as nickel, cobalt, copper, zinc or silver at a pressure of at least 50 atmospheres until the saponification value is reduced but, at the most, by 15 per cent. The said catalysts may be employed as such or activated in known manner, for example by means of tungsten, molybdenum, vanadium, chromium and/or potassium. In most cases the catalysts will be employed on carriers, such as kieselguhr, pumice, silica gel or active carbon.

The process is preferably carried out by subjecting the wax to the action of the hydrogen, either in a fused state or dissolved in inert solvents free from sulphur, as for example in liquid hydrocarbons, such as hexahydro-benzene or toluene, dekahydro-naphthalene, petroleum fractions, such as ligroin, and aromatic hydrocarbons such as benzene or toluene. The hydrogen need not be in a pure state provided it does not contain sulphur or sulphur compounds which would poison the catalysts. In most cases temperatures between 120° and 250° C., preferably between about 200° and about 220° C., are employed, the pressures applied being generally chosen between about 100 and 300 atmospheres. When employing pressures of about 100 atmospheres and temperatures of about 200° C. a duration of treatment of from ½ to 2 hours is usually sufficient. By varying the working conditions, i. e. the temperature, pressure, duration of action, catalysts or rapidity of stirring, it is possible to obtain products differing more or less from the initial waxes and consequently to adapt the waxes to the desired purpose of employment. By raising the pressure and temperature of working within the aforesaid limits the velocity of the reaction and the alteration of the physical properties are accelerated, the optimal pressures and temperatures varying, however, with the different initial materials employed. In any case the temperatures must not exceed the decomposition temperature of the initial material and should not exceed the aforesaid specific limit, since otherwise hydrocarbons might be formed.

By treating natural waxes with hydrogen according to this invention, the content of unsaponifiable matter is increased by up to 10 percent and the iodine value of the waxes decreases down to 0 together with a considerable lightening of the colour taking place in all cases, whereby the possibilities of employment of the waxes become wider. Thus for example the dark brown colour of shellac wax is changed to a pure pale yellow without any disadvantageous alteration of the good, polish-imparting properties of this kind of wax. The high oil-binding capacity for example of carnauba wax is considerably reduced according to the process of the present invention; it is therefore possible to dissolve a considerably larger amount for example of the treated carnauba wax in a definite quantity of solvent for example in oil of turpentine than of untreated wax. In this way the polishing power of the paste obtained is considerably increased since it contains a large proportion of the wax without being too hard, as would be the case if an equal quantity of untreated wax were present in the paste. The waxes obtainable according to the present invention may be employed with advantage for the preparation of liquid wax preparations, as for example shoe creams or floor polishes.

The following examples will further illustrate how this invention may be carried out in practice, but the invention is not restricted to these examples. The parts are by weight.

Example 1

600 parts of carnauba wax, having a brown colour and the following characteristics: acid value 7, saponification value 78.4 and melting point 83.5° C., are treated with hydrogen at 220° C. and under a pressure of 100 atmospheres for 45 minutes in a stirring autoclave in the presence of 20 parts of a cobalt catalyst which has been prepared by the reduction by means of hydrogen of basic cobalt carbonate at 350° C. The product thus obtained has an acid value of 1, a saponification value of 70 and a melting point of 81° C.; its colour is a whitish grey. The oil-binding power of the wax with respect to oil of turpentine is reduced from 1:45 to 1:12, i. e. 1 part of the wax obtained dissolves in 12 parts of oil, whereas 45 parts of oil are needed for dissolving 1 part of the initial wax.

Example 2

600 parts of East African beeswax, having a dark grey colour and the following characteristics: acid value 19.6, saponification value 92.4 and melting point 63° C., together with 50 parts of a catalyst containing 80 per cent of kieselguhr and 20 per cent of nickel which has been prepared by the reduction of nickel carbonate at 400° C. by means of hydrogen are subjected to the action of hydrogen for 2 hours at 200° C. under a pressure of 150 atmospheres in a stirring autoclave. A product having a pale yellow colour is obtained which has an acid value of 16.8, a saponification value of 88.2 and a melting point of 69° C.; it has a slightly higher oil-binding capacity than the initial material. A cream prepared by mixing 15 parts of the treated beeswax with 5 parts of ozokerite, 10 parts of paraffin wax having a melting point of 54° C. and 70 parts of oil of turpentine, is softer and more salve-like than the same cream prepared from the untreated wax.

By treating in the same manner with hydrogen a shellac wax having a melting point of 75° C., a wax is obtained having a melting point of 78° C. and which is furthermore distinguished by its pale colour and its excellent polishing properties.

Example 3

600 parts of candelilla wax, having the following characteristics: acid value 18.2, saponification value 46.2 and melting point 68° C., together with 25 parts of a cobalt catalyst obtainable by reducing cobalt carbonate by means of hydrogen at 350° C. are treated in an autoclave for 30 minutes with hydrogen under a pressure of 100 atmospheres at a temperature of 200° C. The product obtained has an acid value of 8.4, a saponification value of 40 and a melting point of 71° C. The colour is lightened from brown towards yellow. The oil-binding capacity is practically unchanged but nevertheless the wax treated as hereinbefore described may be mixed homogeneously with solvents.

What we claim is:—

1. The process for the production of improved natural waxes which comprises heating a natural wax of ester structure in the presence of a hydrogenation catalyst at a temperature between about 120° and about 250° C. with hydrogen at a pressure of at least 50 atmospheres until the saponification value is reduced, but at the most by 15 per cent.

2. The process for the production of improved natural waxes which comprises heating a natural wax of ester structure in the presence of a hydrogenation catalyst at a temperature between about 120° and about 250° C. with hydrogen at a pressure between about 100 and about 300 atmospheres until the saponification value is reduced but at the most by 15 per cent.

3. The process for the production of improved natural waxes which comprises heating a natural wax of ester structure in the presence of a hydrogenation catalyst comprising a metal selected from the group consisting of cobalt and nickel at a temperature between about 200 and about 220° C. with hydrogen at a pressure of between about 100 and about 200 atmospheres until the saponification value is reduced, but at the most by 15 per cent.

4. The process for the production of improved natural waxes which comprises heating beeswax in the presence of a hydrogenation catalyst comprising nickel at a temperature between about 200 and about 220° C. with hydrogen at a pressure of between about 100 and about 200 atmospheres until the saponification value is reduced, but at the most by 15 per cent.

5. The process for the production of improved natural waxes which comprises heating carnauba wax in the presence of a hydrogenation catalyst comprising cobalt at a temperature between about 200° and about 220° C. with hydrogen at a pressure of between about 100 and about 200 atmospheres until the saponification value is reduced, but at the most by 15 per cent.

6. A modified natural wax of ester structure comprising saturated esters, which modified wax has a saponification value up to 15 per cent below that of the corresponding non-modified wax and a content of unsaponifiable matter increased by up to 10 per cent and a lower acid value than the non-modified wax, which modified wax is obtained according to the procedure of claim 2.

7. A modified natural wax of ester structure comprising saturated esters, which modified wax has a saponification value up to 15% below that of the corresponding non-modified wax, a content of unsaponifiable matter increased by up to 10%, a paler color and a lower acid value than the non-modified wax, said modified wax being obtained according to the procedure of claim 2.

WILHELM PUNGS.
MICHAEL JAHRSTORFER.